Feb. 5, 1935.  H. FRIESER  1,989,748
MULTICOLOR FILTER, USED IN TAKING AND PROJECTING
PHOTOS ON LENTICULATED FILMS
Filed Sept. 8, 1932

INVENTOR
Helmut Frieser
BY: Gifford, Scull & Burgess
ATTORNEYS

Patented Feb. 5, 1935

1,989,748

UNITED STATES PATENT OFFICE 1,989,748

MUTICOLOR FILTER, USED IN TAKING AND PROJECTING PHOTOS ON LENTICULATED FILMS

Helmut Frieser, Berlin-Pichelsdorf, Germany, assignor to Siemens & Halske, Aktiengesellschaft, Siemensstadt, near Berlin, Germany, a corporation of Germany Application September 8, 1932, Serial No. 632,161
In Germany September 9, 1931

3 Claims. (Cl. 95—81.5)

This invention refers to multicolor filters, used in taking and projecting photos on lenticulated films.

One feature of the invention is to secure a better color-rendement than heretofore known. Another feature is to make filters for projection which may sustain the considerable temperatures produced by modern arc-lamps without their colors fading away. Further improvements will be explained in the following description.

According to my invention, two or more solid filters characterized by different spectral permeabilities or transmission are arranged in succession, i. e. in such a manner that a beam of light passes one after the other, or in parallel, i. e. in such a manner that one part of a beam of light passes one filter and the other part passes the other one, both parts added together after passing the filters and acting as a one-colored beam. It may be of advantage to arrange several filters simultaneously in parallel and in succession.

More particularly I construct the said multicolor filters for purposes of lenticulated films in such a manner that one or several of the monochromatic zones forming the screen, are made by arranging solid filters in succession or in parallel.

By using such filters it is possible to reproduce all colors as they appear in nature. All deflections such as color-fading, loss in brilliancy or modification of hue, or even several of these modifications are nearly completely avoided. This results from the fact that in order to reduce the said mistakes to a minimum a certain region in each color space must be at free disposal for each filter such as to permit the selection of the most favourable point to the reproduction of colors. The new filters are apt to fulfill these conditions.

I will describe my invention with the help of the accompanying drawing, which shows all the characteristics of the idea.

In Fig. 1 there is shown a color-triangle for explaining the principle of the invention.

Figure 1:
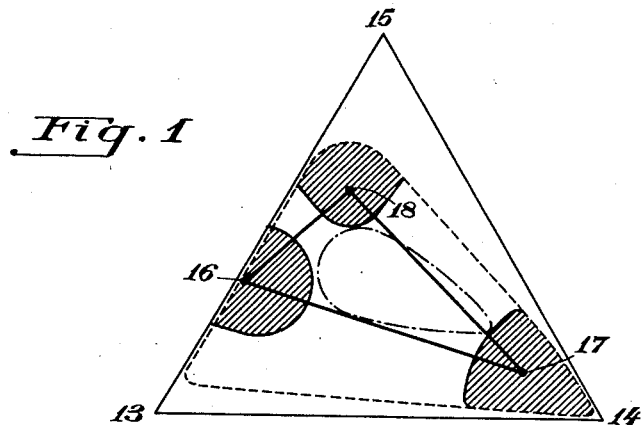

Referring to Fig. 1, the references 13, 14 and 15 designate the corners of a color-triangle. In this color-triangle, the dotted curve represents the situation of the spectral colors completed by the purple hues. Inside this region bordered by the dotted curve is situated the genuine color district marked by dashes and points. The filters helping to the reproduction must be chosen in a way that the polygon inside the color triangle defined by them contains as completely as possible the genuine color district. E. g. a green filter, a red one and a blue one may be used, the references 16, 17 and 18 designating their position. Thus triangle 16, 17, 18 nearly completely surrounds the genuine color district.

Moreover, the points marked by their references 16, 17 and 18, are to be placed in a way that the mistakes resulting from every color-falsification, e. g. color-fading, loss in brilliancy and modification of hue keep as small as possible. For this purpose, each of the three points 16, 17 and 18 must have a space at free disposal, as indicated by the hatched areas. Only if there is a possibility of constructing a color filter representing every point inside the color districts, the most favourable conditions resulting from the theory can be successfully realized in the reproduction.

Here a difficulty arises. The intensities of the components of some colors may be freely chosen to a high extent so that the point characteristical for such a color filter may be placed at a desired spot of the hatched area inside the triangle. E. g this is generally the case with blue filters.

The filters for other colors, however, do not permit without special preparations the point characteristical for them to be placed at a freely chosen point of the triangle. With respect to red filters e. g. these points lie in close neighbourhood of the dotted curve which reproduces the spectral lights. In this case, therefore, we fail to place the point farther inside the dotted district near 16. This want will particularly be felt when using glass filters, as the curve of permeability of such filters shows the existence of a wave-length rather exactly defined: no light of a shorter wave-length can pass the filter. Now glass filters are of a particular importance for the projection as their durability, when exposed to high temperatures, is very great. They show a sufficient genuineness of light.

According to my invention, in this case the color filter is subdivided such as to let the greater part of the effective light pass through a filter possessing normal permeability in red, a blue filter being arranged in parallel with this red filter such as to mix additionally the red and the blue rays. Thus I easily succeed in placing the point characteristical for the combination of the two filters appearing one-colored as a whole, inside the color triangle at any distance from the curve of the spectral lights.

Figure 2:
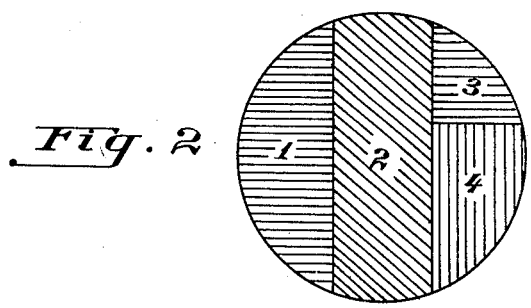
Fig. 2 shows the front of a new filter.

E. g., if there is the question of filters serving to reproduce pictures upon lenticulated films, and more specially on films with embossed cylindrical elements the filter may have a shape as indicated by Figure 2. Referring to this figure, 1 designates a blue filter zone, 2 a green filter zone. The red filter zone is composed of two areas, 3 and 4, the latter being red, the former blue. If the filter is used in combination with a film possessing cylindrical elements with axis running parallel to the separation line between 1 and 2, the light passing through the areas 3 and 4 is mixed additionally. Thus the desired effect is realized, as the light which passed the filters 3 and 4 is impinging on the same point of the photographic layer.

Figure 3:
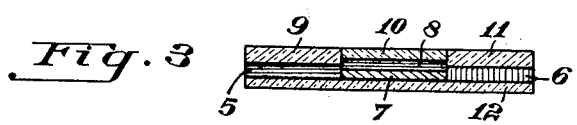
Fig. 3 is showing a filter in section.

One other form embodying the idea of my invention is illustrated in Fig. 3. The totality of green filters show a curve of permeability running steep towards the blue side, flat towards the red side. In order to procure a filter in which the share of light of long wave-length is as small as possible, without shutting the filter, according to my invention before the green filter a blue filter is arranged tending to absorb totally the red rays. Referring to Fig. 3 the reference character 5 designates a blue filter, 6 a red filter. The green filter is composed of two plates 7 and 8, one of which is green, the other one blue. The one plate which is permeable with respect to blue color will generally be much more transparent than the green plate.

The use of my invention is of particular importance if glass filters must be used, for by means of mixing those ingredients supplied by two different filters there is no possibility of procuring a filter, the curve of permeability whereof can be fore-known on the ground of the two single filters.

In most of the cases, the dyeing qualities of the materials in the high temperatures of the melting process change in the presence of another coloring material to such an extent that no suitable filters can be obtained in this manner. Therefore some little disadvantage resulting from the combination of different filters must be taken into the bargain.

These disadvantages become apparent by the fact that it is very difficult to fix different plates with plain and parallel surfaces one upon the other in such a way as to prevent interferences at places where the contact is not thoroughly complete. Moreover, most of the lutes are not durable when exposed to higher temperatures, this being the cause of non-using the filters in combination with projectors. It has been proved that these disadvantages can be surmounted more easily than the difficulties arising from the desire of thoroughly satisfying the optical conditions which are to be realized. If according to my invention the filters consist of glass it is of advantage to lute them, e. g. with hardened Canada balsam, or to cement them together.

When the different filters composing one zone of a polychromatic screen or when the different zones are of different thickness according to further invention, clear transparent glass plates are put upon the thinner parts in such a manner that the thickness of the whole filter is equal at every point. Only by this means it is possible to grind the filter completely even thus preventing any prismatic effect. Besides the plates of clear glass must be chosen in a way that the optical light path through all zones is absolutely equal. Thus the correction of the optical system with which the filter is combined suffers as little as possible or not at all. The afore-mentioned clear glass plates are marked, in Fig. 3, by 9, 10 and 11. Besides, plate 12 is arranged to serve as support.

It is of advantage for the use of such filters not only for taking but also for projecting purposes to choose the different kinds of glass in such a way that their coefficients of thermal expansion are equal as exactly as possible. Thus the risk of bursting in case of raising the temperature is reduced to a minimum.

I claim as my invention:

1. A color filter for use with lenticulated film and comprising a plurality of zones extending parallel to the lenticulations of the film, said zones being of different spectral transmissions and the total color effect of said spectral transmissions being substantially that of white light, at least one of said zones being formed of a plurality of colored glass plates of spectral transmissions which are different from each other but whose total color effect substantially equals said spectral transmission of that zone.

2. A color filter for use with lenticulated film and comprising a plurality of zones extending parallel to the lenticulations of the film, said zones being of different spectral transmissions and the total color effect of said spectral transmissions being substantially that of white light, at least one of said zones being formed of a plurality of areas arranged side by side lengthwise of that zone and formed of colored glass plates of spectral transmissions which are different from each other but whose total color effect substantially equals said spectral transmission of that zone.

3. A color filter for use with lenticulated film and comprising a plurality of zones extending parallel to the lenticulations of the film, said zones being of different spectral transmissions and the total color effect of said spectral transmissions being substantially that of white light, at least one of said zones being formed of a plurality of colored glass plates arranged face to face with adjoining faces in intimate contact with each other, said glass plates having spectral transmissions which are different from each other but whose total color effect substantially equals said spectral transmission of that zone.

HELMUT FRIESER.